United States Patent

Ito

[11] Patent Number: 5,832,142
[45] Date of Patent: Nov. 3, 1998

[54] INTERPOLATING OPERATION METHOD AND APPARATUS FOR IMAGE SIGNALS

[75] Inventor: Wataru Ito, Kanagawa-ken, Japan

[73] Assignee: Fuji Photo Film Co., LTD., Kanagawa-ken, Japan

[21] Appl. No.: 687,963

[22] Filed: Jul. 29, 1996

[30] Foreign Application Priority Data

Aug. 9, 1995 [JP] Japan .................................. 7-203208

[51] Int. Cl.$^6$ ................................ G06K 9/32; G06K 9/40
[52] U.S. Cl. ......................... 382/300; 382/254; 382/263
[58] Field of Search .................................. 382/254, 263, 382/300

[56] References Cited

U.S. PATENT DOCUMENTS 5,054,100 10/1991 Tai .......................................... 382/263

Primary Examiner—Leo H. Boudreau
Assistant Examiner—Daniel G. Mariam
Attorney, Agent, or Firm—Sughrue, Mion, Zinn, Macpeak & Seas, PLLC

[57] ABSTRACT

An original image signal, which represents an original image and is made up of a series of original image signal components $Y_{ij}$, is obtained. Corresponding interpolation coefficients $C_{ij}$ and $B_{ij}$, which are set for each of the original image signal components $Y_{ij}$, in an interpolating function $\alpha$ represented by Formula (1) for obtaining an interpolation image having a relatively high sharpness and an interpolating function $\beta$ represented by Formula (2) for obtaining an interpolation image having a relatively low sharpness, are linearly combined each other according to Formula (3) including a weighting coefficient w, thereby obtaining a new interpolation coefficient $A_{ij}$. An interpolating operation is carried out on the original image signal components $Y_{ij}$ by using an interpolating function h represented by Formula (4), and an interpolation image signal made up of a series of image signal components which occur at intervals different from those of the original image signal components $Y_{ij}$ is obtained.

$$\alpha = \Sigma C_{ij} \cdot Y_{ij} \quad (1)$$
$$\beta = \Sigma B_{ij} \cdot Y_{ij} \quad (2)$$
$$A_{ij} = (1-w) \cdot C_{ij} + w \cdot B_{ij} \quad (3)$$
$$h = \Sigma A_{ij} \cdot Y_{ij} \quad (4)$$

A density vector at each interpolation picture element on the image is calculated, and the weighting coefficient w is corrected to be smaller as the density vector becomes larger.

6 Claims, 4 Drawing Sheets

INTERPOLATING OPERATION METHOD AND APPARATUS FOR IMAGE SIGNALS

BACKGROUND OF THE INVENTION

1. Field of the Invention

This invention relates to an interpolating operation method and apparatus for an image signal.

2. Description of the Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields.

Further it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. Radiation image recording and reproducing systems, which use stimulable phosphor sheets, have been put into practice and are advantageous over conventional radiography using silver halide photographic materials, in that images can be recorded even when the energy intensity of the radiation, to which the stimulable phosphor sheet is exposed, varies over a wide range.

In image recording and reproducing systems, in which an image signal is obtained in the manner described above and a visible image is reproduced from the image signal, in cases where the region of interest in the visible image is to be viewed in more detail, the region of interest is often enlarged and reproduced.

Such an enlarged image can be obtained by carrying out a predetermined interpolating operation on the original image signal, which has been obtained by reading out an original image, forming an interpolation image signal, which is a secondary image signal and is made up of a number of image signal components different from that of the original image signal, and reproducing a visible image from the interpolation image signal.

As the interpolating operation methods for carrying out interpolating operations on image signals, various methods have heretofore been proposed. Among such methods, the method using third-order spline interpolating functions is popular. With the interpolating operation method using the third-order spline interpolating functions, digital original image signal components ($Y_k$) in each section are connected by a third-order function $\{f_k\}$, and the value of $f_k$ corresponding to a position, at which an interpolation point is set, (i.e., a setting position in each section) is taken as the value of the interpolated image signal component.

Such an interpolating operation is generally referred to as "cubic spline interpolating operation". How the cubic spline interpolating operation is carried out will be described hereinbelow.

Figure 6:
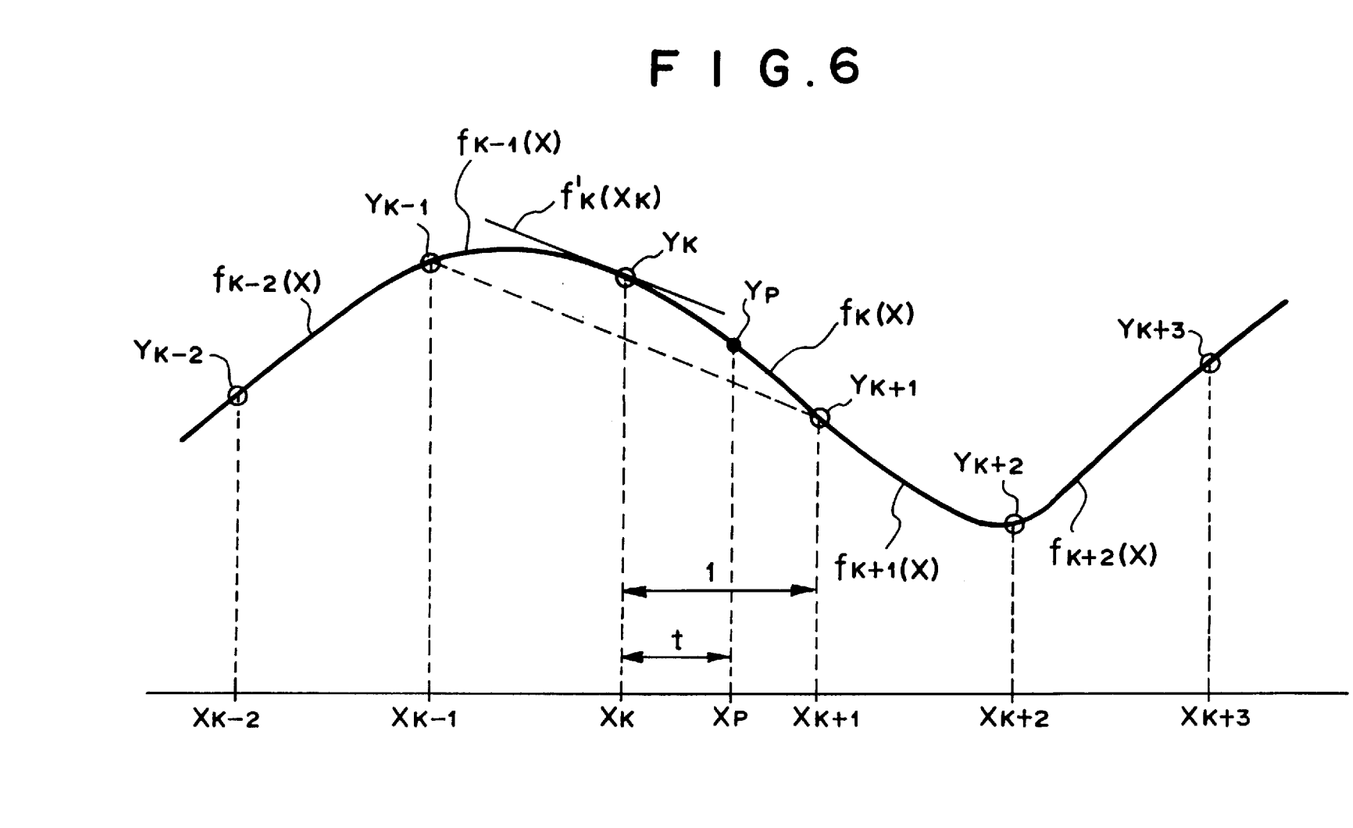
FIG. 6 is an explanatory graph showing how interpolated image signal components are obtained with a conventional cubic spline interpolating operation from original image signal components, which are sampled with a period of an equal interval and represent sampling points (picture elements) arrayed in one direction.

As illustrated in FIG. 6, the image signal components (the original image signal components), which have been detected as digital signal components from an original image and represent a series of picture elements $X_{k-2}$, $X_{k-1}$, $X_k$, $X_{k+1}$, $X_{k+2}$, ..., are respectively represented by $Y_{k-2}$, $Y_{k-1}$, $Y_k$, $Y_{k+1}$, $Y_{k+2}$, ... A third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

How the interpolating operation is carried out when a point taken for interpolation (hereinbelow referred to as "the interpolation point") $X_p$ falls within the section $X_k \sim X_{k+1}$ will be described hereinbelow. The spline interpolating function $f_k$ corresponding to the section $X_k \sim X_{k+1}$ is represented by Formula (3).

$$f_k(x) = A_k x^3 + B_k x^2 + C_k x + D_k \quad (3)$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (4) to (7) to be satisfied.

$$f_k(X_k) = Y_k \quad (4)$$

$$f_k(X_{k+1}) = Y_{k+1} \quad (5)$$

$$f_k'(X_k) = f_{k-1}'(X_k) \quad (6)$$

$$f_k'(X_{k+1}) = f_{k+1}'(X_{k+1}) \quad (7)$$

In these formulas, $f_k'$ represents the first-order differentiation ($3A_k x^2 + 2B_k x + C_k$) of the function $f_k$.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1} - Y_{k-1})/(X_{k+1} - X_{k-1})$ of the image signal components $Y_{k-1}$ and $Y_{k+1}$ representing the picture elements $X_{k-1}$ and $X_{k+1}$. Therefore, it is necessary for Formula (8) to be satisfied.

$$f_k'(X_k) = (Y_{k+1} - Y_{k-1})/(X_{k+1} - X_{k-1}) \quad (8)$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2} - Y_k)/(X_{k+2} - X_k)$ of the image signal components $Y_k$ and $Y_{k+2}$ representing the picture elements $X_k$ and $X_{k+2}$. Therefore, it is necessary for Formula (9) to be satisfied.

$$f_k'(X_{k+1}) = (Y_{k+2} - Y_k)/(X_{k+2} - X_k) \quad (9)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (4) to (9), the formulas shown below obtain.

$$f_k(0)=D_k=Y_k$$

$$f_k(1)=A_k+B_k+C_k+D_k=Y_{k+1}$$

$$f_k'(0)=C_k=(Y_{k+1}-Y_{k-1})/2$$

$$f_k'(1)=3A_k+2B_k+C_k=(Y_{k+2}-Y_k)/2$$

Therefore, the formulas shown below obtain.

$$A_k=(Y_{k+2}-3Y_{k+1}+3Y_k-Y_{k-1})/2$$

$$B_k=(-Y_{k+2}+4Y_{k+1}-5Y_k+2Y_{k-1})/2$$

$$C_k=(Y_{k+1}-Y_{k-1})/2$$

$$D_k=Y_k$$

As described above, the variable conversion of X=t is carried out, and therefore the spline interpolating function $f_k(x)$ is represented by the formula shown below.

$$f_k(x)=f_k(t)$$

Therefore, an interpolated image signal component $Y_p$ corresponding to the interpolation point $X_p$ may be represented by Formula (10).

$$Y_p=f_k(t)=A_k t^3+B_k t^2+C_k t+D_k \quad (10)$$

Substituting the coefficients $A_k$, $B_k$, $C_k$, and $D_k$ into Formula (10) yields $$Y_p = \{(Y_{k+2}-3Y_{k+1}+3Y_k-Y_{k-1})/2\}t^3 +$$
$$\{(-Y_{k+2}+4Y_{k+1}-5Y_k+2Y_{k-1})/2\}t^2 +$$
$$\{(Y_{k+1}-3Y_{k-1})/2\}t+Y_k$$

Arranging this formula with respect to the image signal components $Y_{k-1}$, $Y_k$, $Y_{k+1}$, and $Y_{k+2}$ yields Formula (11).

$$Y_p = \{(-t^3+2t^2-t)/2\}Y_{k-1} + \quad (11)$$
$$\{(3t^3-5t^2+2)/2\}Y_k +$$
$$\{(-3t^3+4t^2+t)/2\}Y_{k+1} +$$
$$\{(t^3-t^2-t)/2\}Y_{k+2}$$

The coefficients for the original image signal components $Y_{k-1}$, $Y_k$, $Y_{k+1}$, and $Y_{k+2}$ are referred to as the interpolation coefficients $c_{k-1}$, $c_k$, $c_{k+1}$, and $c_{k+2}$. Specifically, the interpolation coefficients $c_{k-1}$, $c_k$, $c_{k+1}$, and $c_{k+2}$, which respectively correspond to the original image signal components $Y_{k-1}$, $Y_k$, $Y_{k+1}$, and $Y_{k+2}$ in Formula (31), may be represented by the formulas shown below.

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

As described above, in the cubic spline interpolating operation, it is necessary that the spline interpolating function passes through the original sampling points (picture elements), and that the first-order differential coefficient of the spline interpolating function is continuous between adjacent sections. With the interpolating function for the cubic spline interpolating operation, the interpolation image signal for use in the reproduction of a secondary image (i.e., the image obtained from the interpolating operation), which has a comparatively high sharpness, is obtained. On the other hand, as an interpolating function for obtaining the interpolation image signal representing the secondary image, in which the sharpness is comparatively low and which is smooth, for example, a B spline interpolating operation function is known. In the B spline interpolating operation, the spline interpolating function need not pass through the original sampling points (picture elements), and it is necessary that the first-order differential coefficient and the second-order differential coefficient {represented by f"(X)} of the spline interpolating function are continuous between adjacent sections.

Specifically, in Formula (3), $$f_k(x)=A_k x^3+B_k x^2+C_k x+D_k \quad (3)$$

the conditions shown below should be satisfied.

$$f_k'(X_k)=f_{k-1}'(X_k) \quad (6)$$

$$f_k'(X_{k+1})=f_{k+1}'(X_{k+1}) \quad (7)$$

$$f_k''(X_k)=f_{k-1}''(X_k) \quad (12)$$

$$f_k''(X_{k+1})=f_{k+1}''(X_{k+1}) \quad (13)$$

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (8) to be satisfied.

$$f_k'(X_k)=(Y_{k+1}-Y_{k-1})/(X_{k+1}-X_{k-1}) \quad (8)$$

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (9) to be satisfied.

$$f_k'(X_{k+1})=(Y_{k+2}-Y_k)/(X_{k+2}-X_k) \quad (9)$$

In general, the function f(X) may be approximately represented by Formula (14).

$$f(X)=f(0)+f'(0)X+\{f''(0)/2\}X^2 \quad (14)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (6), (7) and (12) to (14), the formulas shown below obtain.

$$f_k'(0)=C_k=(Y_{k+1}-Y_{k-1})/2$$

$$f_k'(1)=3A_k+2B_k+C_k=(Y_{k+2}-Y_k)/2$$

$f_k''(0) = Y_{k+1} - 2Y_k + Y_{k-1} = 2B$

Therefore, the formulas shown below obtain.

$A_k = (Y_{k+2} - 3Y_{k+1} + 3Y_k - Y_{k-1})/6$ $B_k = (Y_{k+1} - 2Y_k + Y_{k-1})/2$ $C_k = (Y_{k+1} - Y_{k-1})/2$

Since $D_k$ is unknown, it is represented by the formula $D_k = (D_1 Y_{k+2} + D_2 Y_{k+1} + D_3 Y_k + D_4 Y_{k-1})/6$ As described above, the variable conversion of X=t is carried out, and therefore the spline interpolating function $f_k(x)$ is represented by the formula shown below.

$f_k(x) = f_k(t)$

Therefore, $$f_k(t) = \{(Y_{k+2} - 3Y_{k+1} + 3Y_k - Y_{k-1})/6\}t^3 +$$
$$\{(Y_{k+1} - 2Y_k + Y_{k-1})/2\}t^2 +$$
$$\{(Y_{k+1} - Y_{k-1})/2\}t +$$
$$(D_1 Y_{k+2} + D_2 Y_{k+1} + D_3 Y_k + D_4 Y_{k-1})/6$$

Arranging this formula with respect to the image signal components $Y_{k-1}$, $Y_k$, $Y_{k+1}$, and $Y_{k+2}$ yields Formula (25).

$$f_k(t) = \{(-t^3 + 3t^2 - 3t + D_4)/6\}Y_{k-1} + \qquad (15)$$
$$\{(3t^3 - 6t^2 + D_3)/6\}Y_k +$$
$$\{(-3t^3 + 3t^2 + 3t + D_2)/6\}Y_{k+1} +$$
$$\{(t^3 + D_1)/6\}Y_{k+2}$$

If t is set to be t=1, the formula shown below will obtain.

$f_k(1) = \{(D_4-1)/6\}Y_{k-1} + \{(D_3-3)/6\}Y_k + \{(D_2+3)/6\}Y_{k+1} + \{(D_1+1)/6\}Y_{k+2}$

As for the section $X_{k+1} \sim X_{k+2}$, Formula (15) may be rewritten as Formula (16)

$$f_{k+1}(t) = \{(-t^3 + 3t^2 - 3t + D_4)/6\}Y_k + \qquad (16)$$
$$\{(3t^3 - 6t^2 + D_3)/6\}Y_{k+1} +$$
$$\{(-3t^3 + 3t^2 + 3t + D_2)/6\}Y_{k+2} +$$
$$\{(t^3 + D_1)/6\}Y_{k+3}$$

If t is set to be t=0, the formula shown below will obtain.

$f_{k+1}(0) = (D_4/6)Y_k + (D_3/6)Y_{k+1} + (D_2/6)Y_{k+2} + (D_1/6)Y_{k+3}$

From the continuity condition $\{f_k(1) = f_{k+1}(0)\}$ and the condition in that the coefficients corresponding to the respective original image signal components are equal to each other, $D_4 - 1 = 0$, $D_3 - 3 = D_4$, $D_2 + 3 = D_3$, $D_1 + 1 = D_2$, and $D_1 = 0$. Therefore, $D_k = (Y_{k+1} + 4Y_k + Y_{k-1})/6$ Accordingly, Formula (17) obtains.

$$Y_p = f_k(t) = \{(-t^3 + 3t^2 - 3t + 1)/6\}Y_{k-1} + \qquad (17)$$
$$\{(3t^3 - 6t^2 + 4)/6\}Y_k +$$
$$\{(-3t^3 + 3t^2 + 3t + 1)/6\}Y_{k+1} +$$
$$(t^3/6)Y_{k+2}$$

Therefore, the interpolation coefficients $b_{k-1}$, $b_k$, $b_{k+1}$, and $b_{k+2}$, which respectively correspond to the original image signal components $Y_{k-1}$, $Y_k$, $Y_{k+1}$, and $Y_{k+2}$, may be represented by the formulas shown below.

$b_{k-1} = (-t^3 + 3t^2 - 3t + 1)/6$ $b_k = (3t^3 - 6t^2 + 4)/6$ $b_{k+1} = (-3t^3 + 3t^2 + 3t + 1)/6$ $b_{k+2} = t^3/6$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

In this manner, in cases where a secondary image (an interpolation image) having a high sharpness is to be reproduced, for example, the cubic spline interpolating operation may be used. In cases where a secondary image, which has a low sharpness and is smooth, is to be reproduced, for example, the B spline interpolating operation may be used.

In U.S. Pat. No. 5,048,105, the applicant has proposed an interpolating operation method for an image signal, with which the sharpness of an interpolation image can be adjusted finely by combining a cubic spline interpolating operation and a B spline interpolating operation. With the proposed method, the interpolation coefficients $c_{k-1}$, $c_k$, $c_{k+1}$, and $c_{k+2}$ for the cubic spline interpolating operation and the interpolation coefficients $b_{k-1}$, $b_k$, $b_{k+1}$, and $b_{k+2}$ for the B spline interpolating operation, which coefficients correspond to each other and are set for the respective original image signal components $Y_{k-1}$, $Y_k$, $Y_{k+1}$, and $Y_{k+2}$, are weighted and added to each other. By alteration of the weighting ratio (coefficient) $\alpha$, it is possible to obtain a secondary image having a desired level of sharpness, which is intermediate in the range from the highest sharpness to the lowest smooth sharpness.

Specifically, in cases where the interpolation coefficients for the cubic spline interpolating operation are represented by $c_{k-1}$, $c_k$, $c_{k+1}$, and $c_{k+2}$, and the interpolation coefficients for the B spline interpolating operation are represented by $b_{k-1}$, $b_k$, $b_{k+1}$, and $b_{k+2}$, weighted interpolation coefficients $a_{k-1}$, $a_k$, $a_{k+1}$, and $a_{k+2}$ are set as shown below.

$a_{k-1} = (1-\alpha)c_{k-1} + \alpha b_{k-1}$ $a_k = (1-\alpha)c_k + \alpha b_k$ $a_{k+1} = (1-\alpha)c_{k+1} + \alpha b_{k+1}$ $a_{k+2} = (1-\alpha)c_{k+2} + \alpha b_{k+2}$ wherein $0 \leq \alpha \leq 1$.

In accordance with the thus obtained new interpolation coefficients $a_{k-1}$, $a_k$, $a_{k+1}$, and $a_{k+2}$, an interpolated image signal component $Y_p$ is calculated with Formula (18).

$Y_p = a_{k-1} Y_{k-1} + a_k Y_k + a_{k+1} Y_{k+1} + a_{k+2} Y_{k+2}$ (18)

An actual image is composed of the picture elements arrayed in two-dimensional directions. Therefore, the interpolation coefficient $a_k$ is represented as the interpolation coefficient Bij or Cij corresponding to each of two different directions (an i direction and a j direction) of an array of picture elements in the image.

With the interpolating operation method for an image signal, which is disclosed in U.S. Pat. No. 5,048,105, the adjustment of sharpness can be carried out only within the range from the sharpness, which corresponds to the sharpest image obtained with the cubic spline interpolating operation, to the sharpness, which corresponds to the smoothest image obtained with the B spline interpolating operation. However the sharpness of the image differs according to what part of the body the image is, and accordingly, in the case where an image whose sharpness is to be enhanced includes a flat part in which variation in density is relatively small, when a cubic spline interpolating operation is carried out on the image, even small noise is enhanced and the image of the flat part is deteriorated. On the other hand, in the case where an image whose sharpness need not be so high includes an edge portion in which variation in density is large, when a B spline interpolating operation is carried out on the image, sharpness is lowered at the edge portion and a blurred image is obtained.

SUMMARY OF THE INVENTION

In view of the foregoing observations and description, the primary object of the present invention is to provide an interpolating operation method and apparatus for an image signal which enables the sharpness of the image to be adjusted according to what part of the body the image is.

The present invention provides an interpolating operation method and apparatus for an image signal, comprising the steps of:

obtaining an original image signal, which represents an original image and is made up of a series of original image signal components Yij each representing the value of the corresponding original picture element, linearly combining interpolation coefficients Cij and Bij, which correspond to each other and are set for each of the original image signal components Yij, in an interpolating function α represented by Formula (1) for obtaining an interpolation image having a relatively high sharpness and an interpolating function β represented by Formula (2) for obtaining an interpolation image having a relatively low sharpness, the linear combination being carried out with Formula (3) including a weighting coefficient w, a new interpolation coefficient Aij being obtained from the weighted linear combination, and carrying out an interpolating operation on the original image signal components Yij by using an interpolating function h having the new interpolation coefficient Aij, which function is represented by Formula (4), an interpolation image signal being obtained from the interpolating operation, the interpolation image signal being made up of a series of image signal components each representing the value of the corresponding interpolation picture element, which occur at intervals different from those of the original image signal components Yij, $$\alpha = \Sigma Cij \cdot Yij \quad (1)$$

$$\beta = \Sigma Bij \cdot Yij \quad (2)$$

$$Aij = (1-w) \cdot Cij + w \cdot Bij \quad (3)$$

$$h = \Sigma Aij \cdot Yij \quad (4)$$

wherein a density vector at each interpolation picture element on the image is calculated, and the weighting coefficient w is corrected to be smaller as the density vector becomes larger.

Said interpolating function for obtaining an interpolation image having a relatively high sharpness may be, for instance, a cubic spline interpolating operation function and said interpolating function for obtaining an interpolation image having a relatively low sharpness may be, for instance, a B spline interpolating operation function.

However, the interpolating operation method for an image signal in accordance with the present invention is not limited to the combination of the cubic spline interpolating operation function and the B spline interpolating operation function. For example, various interpolating operation functions, such as the B spline interpolating operation function, the cubic spline interpolating operation function, a linear interpolating function, and a Lagrangean interpolating operation function, may be used, and an arbitrary combination of two of these functions may be employed.

Each of the term "interpolation coefficient Bij" and the term "interpolation coefficient Cij" as used herein means the interpolation coefficient corresponding to each of two different directions (an i direction and a j direction) of an array of picture elements in the image. (Each of the interpolation coefficients Bij and Cij corresponds to the coefficient, by which each original image signal component is multiplied, e.g. each of the interpolation coefficients $a_{k-1}$, $a_k$, $a_{k+1}$, and $a_{k+2}$ described above for the conventional technique.)

In an image, the density vector is generally larger in a portion where the change in density is larger and it may be considered that an edge portion at which the density sharply changes extends in a direction perpendicular to the density vector in the image. On the other hand, when the density vector is relatively small, a flat portion where the change in density is small exists in a region near the density vector.

This invention has been made on the basis of the aforesaid fact. In accordance with the present invention, when a new interpolation coefficient is obtained by linearly combining interpolation coefficients which correspond to each other and are set for each of the original image components in a first interpolating function for obtaining an interpolation image having a relatively high sharpness and a second interpolating function for obtaining an interpolation image having a relatively low sharpness, the density vector at the interpolation picture element is obtained and the first interpolation coefficient is weighted more than the second interpolation coefficient at the interpolation picture element at which the density vector is large. Accordingly, at an edge portion where the density vector is large, an interpolating operation for a relatively high sharpness is carried out and at a flat portion where the density vector is small, an interpolating operation for a relatively low sharpness is carried out. Therefore, an interpolation image in which the sharpness is enhanced at edge portions and is less enhanced at flat portions can be obtained. Thus the sharpness of the image can be adjusted according to what part of the body the image is and an interpolation image excellent in quality and suitable for diagnosis can be obtained.

DESCRIPTION OF THE PREFERRED EMBODIMENT

The present invention will hereinbelow be described in further detail with reference to the accompanying drawings.

Figure 1:
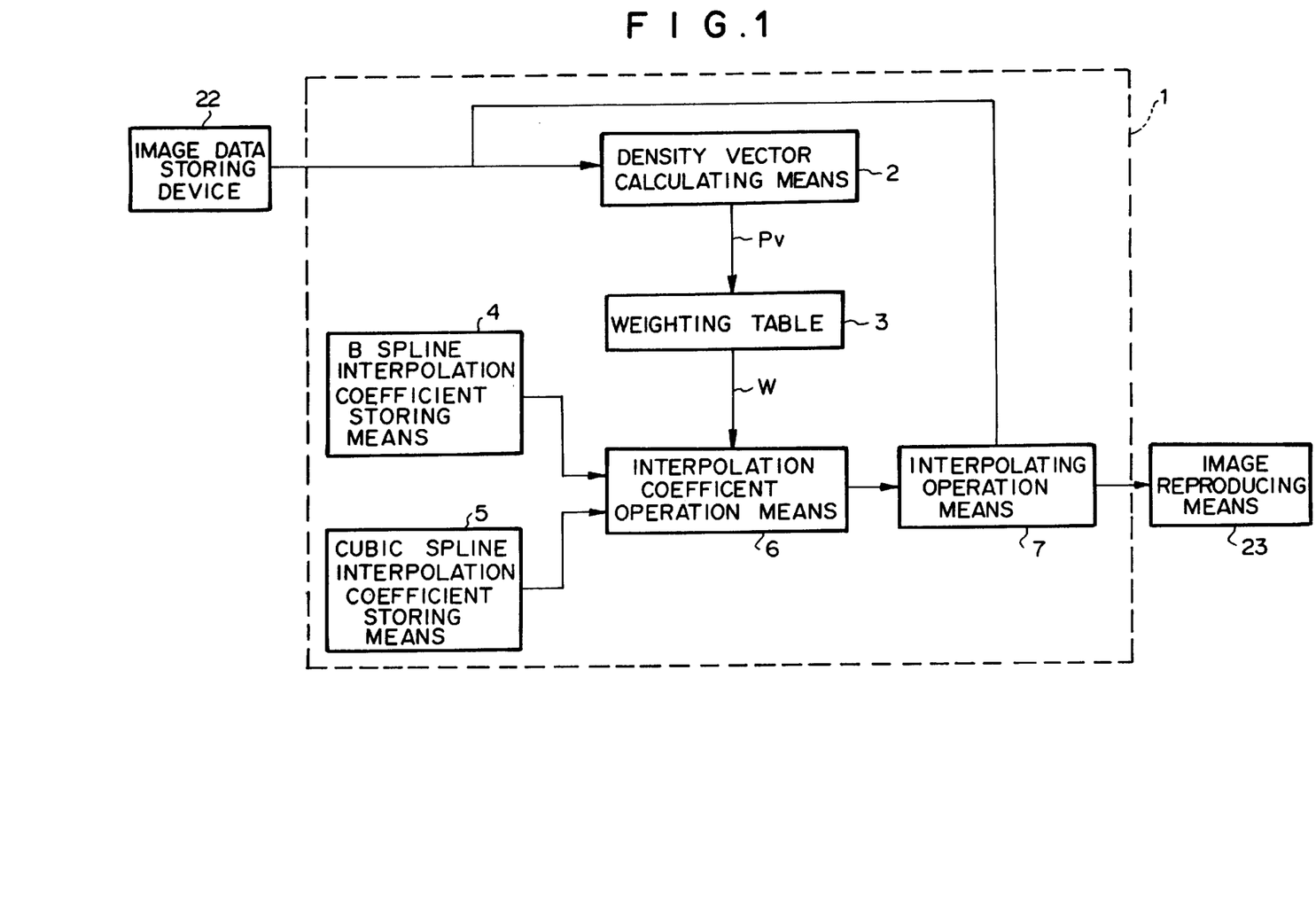
FIG. 1 is a schematic block diagram showing an image reproducing system provided with an interpolating operation apparatus for carrying out the interpolating operation method for an image signal in accordance with an embodiment of the present invention.

FIG. 1 is a schematic block diagram showing an image reproducing system provided with an interpolating operation apparatus 1, which is an embodiment of the interpolating operation apparatus for carrying out the interpolating operation method for an image signal in accordance with the present invention. With reference to FIG. 1, the image reproducing system comprises an image signal storing device 22 for storing an image signal Sorg representing an image, and an interpolating operation apparatus 1 for carrying out an interpolating operation on the image signal (hereinbelow referred to as the primary image signal or the original image signal) Sorg, which is received from the image signal storing device 22, such that an image signal conforming to a predetermined reproduction format may be obtained. The image reproducing system also comprises an image reproducing means 23 such as a CRT or a printer for reproducing a visible image at a desired magnification from an image signal which has been obtained from the interpolating operation carried out by the interpolating operation apparatus 1.

The primary image signal Sorg used in this embodiment is made up of a series of digital image signal components $Y_{k-2}, Y_{k-1}, Y_k, Y_{k+1}, Y_{k+2}, \ldots$ respectively corresponding to sampling points (picture elements) $X_{k-2}, X_{k-1}, X_k, X_{k+1}, X_{k+2}, \ldots$, which are sampled with a period of an equal interval and arrayed in one direction.

The interpolating operation apparatus 1 comprises a density vector calculating means 2 which calculates the density vector Pv at each of the interpolation picture elements, a weighting table storing means 3 for storing weighting coefficients w which vary according to the density vector Pv calculated by the density vector calculating means 2 and are used when linearly combining interpolation coefficients to be described later, a cubic spline interpolation coefficient storing means 5, a B spline interpolation coefficient storing means 4, an interpolation coefficient operation means 6 and an interpolating operation means 7.

The cubic spline interpolation coefficient storing means 5 stores interpolation coefficients $c_{k-1}$, $c_k$, $c_{k+1}$, and $c_{k+2}$, which respectively correspond to the original image signal components $Y_{k-1}$, $Y_k$, $Y_{k+1}$, and $Y_{k+2}$, in Formula (19). Formula (19) serves as a third-order cubic spline interpolating operation formula and represents a first secondary image signal component $Y_p1$ corresponding to an interpolation point $X_p$, which is located between original sampling points $X_k$ and $X_{k+1}$. The interpolation coefficients $c_{k-1}$, $c_k$, $c_{k+1}$, and $c_{k+2}$ are stored as being the ones represented by the formulas shown below.

$$Y_p1 = c_{k-1}Y_{k-1} + c_k Y_k + c_{k+1}Y_{k+1} + c_{k+2}Y_{k+2} \tag{19}$$

$$c_{k-1} = (-t^3 + 2t^2 - t)/2$$

$$c_k = (3t^3 - 5t^2 + 2)/2$$

$$c_{k+1} = (-3t^3 + 4t^2 + t)/2$$

$$c_{k+2} = (t^3 - t^2)/2$$

in which t, where $0 \leq t \leq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The B spline interpolation coefficient storing means 4 stores interpolation coefficients $b_{k-1}$, $b_k$, $b_{k+1}$, and $b_{k+2}$, which respectively correspond to the original image signal components $Y_{k-1}$, $Y_k$, $Y_{k+1}$, and $Y_{k+2}$, in Formula (20). Formula (20) serves as a third-order B spline interpolating operation formula and represents a second secondary image signal component $Y_p2$ corresponding to the interpolation point $X_p$, which is located between original sampling points $X_k$ and $X_{k+1}$. The interpolation coefficients $b_{k-1}$, $b_k$, $b_{k+1}$, and $b_{k+2}$ are stored as being the ones represented by the formulas shown below.

$$Y_p2 = b_{k-1}Y_{k-1} + b_k Y_k + b_{k+1}Y_{k+1} + b_{k+2}Y_{k+2} \tag{20}$$

$$b_{k-1} = (-t^3 + 3t^2 - 3t + 1)/6$$

$$b_k = (3t^3 - 6t^2 + 4)/6$$

$$b_{k+1} = (-3t^3 + 3t^2 + 3t + 1)/6$$

$$b_{k+2} = t^3/6$$

in which t, where $0 \leq t \leq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The interpolation coefficient operation means 6 receives the interpolation coefficients (hereinbelow referred to as the cubic spline interpolation coefficients) $c_{k-1}$, $c_k$, $c_{k+1}$, and $c_{k+2}$ from the cubic spline interpolation coefficient storing means 5 and receives the interpolation coefficients (hereinbelow referred to as the B spline interpolation coefficients) $b_{k-1}$, $b_k$, $b_{k+1}$, and $b_{k+2}$ from the B spline interpolation coefficient storing means 4. The interpolation coefficient operation means 6 weights the cubic spline interpolation coefficients $c_{k-1}$, $c_k$, $c_{k+1}$, and $c_{k+2}$ and the B spline interpolation coefficients $b_{k-1}$, $b_k$, $b_{k+1}$, and $b_{k+2}$ by weighting coefficients w obtained from the weighting table storing means 3 and adds the weighted interpolation coefficients, which coefficients correspond to each other and are set for the respective original image signal components $Y_{k-1}$, $Y_k$, $Y_{k+1}$, and $Y_{k+2}$. The weighted additions are carried out with Formulas (21) to (24):

$$a_{k-1} = (1-w)c_{k-1} + wb_{k-1} \tag{21}$$

$$a_k = (1-w)c_k + wb_k \tag{22}$$

$$a_{k+1} = (1-w)c_{k+1} + wb_{k+1} \tag{23}$$

$$a_{k+2} = (1-w)c_{k+2} + wb_{k+2} \tag{24}$$

The interpolating operation means 7 stores Formula (18) shown below as the operation formula with the third-order spline interpolating function and calculates the value of the interpolated image signal component $Y_p$, which corresponds to the interpolation point $X_p$, with Formula (18) in accordance with the interpolation coefficients $a_{k-1}$, $a_k$, $a_{k+1}$, and $a_{k+2}$ according to the weighting coefficients w, which have been calculated by the interpolation coefficient operation means 6, and the original image signal components $Y_{k-1}$, $Y_k$, $Y_{k+1}$, and $Y_{k+2}$.

$$Y_p = a_{k-1}Y_{k-1} + a_k Y_k + a_{k+1}Y_{k+1} + a_{k+2}Y_{k+2} \qquad (18)$$

The interpolation coefficients $a_{k-1}$, $a_k$, $a_{k+1}$, and $a_{k+2}$, which are stored in the interpolation coefficient storing means 4, are calculated previously with the algorithms described above. An actual image is composed of the picture elements arrayed in two-dimensional directions. Therefore, the interpolation coefficients $a_{k-1}$, $a_k$, $a_{k+1}$, and $a_{k+2}$ are calculated for each of two different directions (an i direction and a j direction) of an array of the picture elements in the image. The interpolation coefficients $a_{k-1}$, $a_k$, $a_{k+1}$, and $a_{k+2}$ having been calculated in this manner often represented as the interpolation coefficients Aij. The B spline interpolation coefficients $b_{k-1}$, $b_k$, $b_{k+1}$, and $b_{k+2}$, which have been calculated for each of the i direction and the j direction of the array of the picture elements in the image, are represented as the interpolation coefficients Bij. Also, the cubic spline interpolation coefficients $c_{k-1}$, $c_k$, $c_{k+1}$, and $c_{k+2}$, which have been calculated for each of the i direction and the j direction of the array of the picture elements in the image, are represented as the interpolation coefficients Cij.

In cases where the interpolation coefficient operation means 6 is caused to previously store Formulas (21), (22), (23), and (24), it can also serve as the B spline interpolation coefficient storing means 4 and the cubic spline interpolation coefficient storing means 5.

How the image reproducing system provided with this embodiment operates will be described hereinbelow.

Firstly, the interpolating operation apparatus 1 reads the primary image signal Sorg from the image signal storing device 22. Further, in order to obtain the secondary image signal, which represents an enlarged image corresponding to the image size enlargement scale factor input from an input means (not shown), the interpolating operation apparatus 1 inputs the primary image signal Sorg into the interpolating operation apparatus 1.

In the interpolating operation apparatus 1, the primary image signal Sorg is fed into the density vector calculating means 2 and the interpolating operation means 7.

Figure 2:
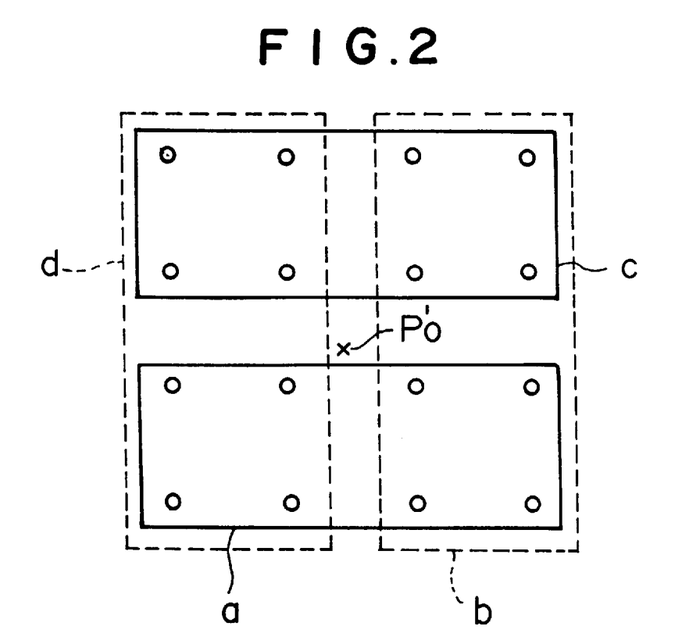
FIG. 2 is a view for illustrating calculation of the density vector.

As shown in FIG. 2, the density vector calculating means 2 allocates sixteen picture elements in the vicinity of interpolation picture element $P_0'$, whose interpolation image signal component is to be calculated, to four regions a, b, c and d, and calculates the sums Wa, Wb, Wc and Wd of the original image signal components in the respective regions. Then density vector Pv is calculated as follows.

$$Pv = (Wb - Wa, Wd - Wc)$$

Figure 3:
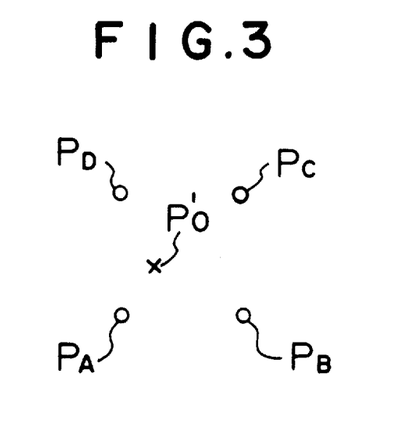
FIG. 3 is another view for illustrating calculation of the density vector.

Alternatively, as shown in FIG. 3, the density vector Pv may be calculated on the basis of the original image signal components Sa, Sb, Sc and Sd of four picture elements around the interpolation picture element $P_0'$, whose interpolation image signal component is to be calculated, according to the following formula.

$$Pv = (Sb - Sa, Sd - Sc)$$

Figure 4:
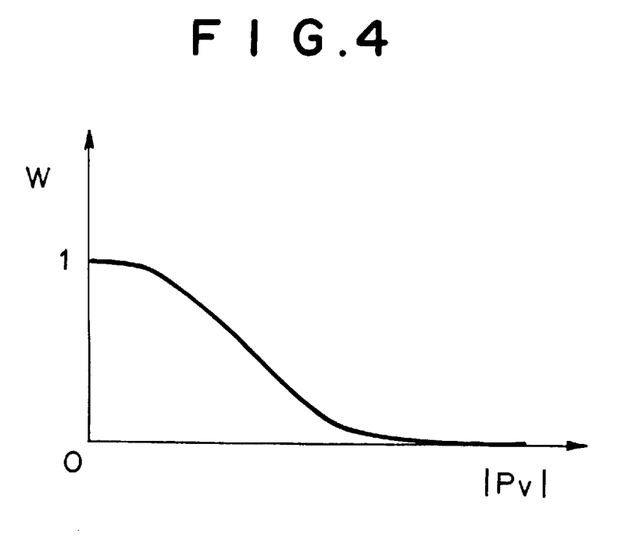
FIG. 4 is a view showing the weighting table.

The weighting coefficient w is a function of the density vector Pv and monotonously decreases with increase in the density vector Pv as shown in FIG. 4, which shows the weighting table representing the relation between the density vector Pv and the weighting coefficient w.

The B spline interpolation coefficient storing means 4 and the cubic spline interpolation coefficient storing means 5 set the values of t in the respective interpolation coefficients in accordance with the image size enlargement scale factor having been input from the input means (not shown). For example, in cases where an image size enlargement scale factor of 2 is input, values of 0.5 and 22 are set as the values of t. In cases where an image size enlargement scale factor of 4 is input, values of 0.25, 0.5, 0.75, and 1.0 are set as the values of t. In cases where an image size enlargement scale factor of 10 is input, values of 0.1, 0.2, . . . , 1.0 are set as the values of t. Information representing the B spline interpolation coefficients and the cubic spline interpolation coefficients, which are for each of the thus set values of t, is fed into the interpolation coefficient operation means 6.

The interpolation coefficient operation means 6 calculates the new interpolation coefficients $a_{k-1}$, $a_k$, $a_{k+1}$, and $a_{k+2}$ for each of the values of t according to the value of the weighting coefficient w from the received B spline interpolation coefficients and the received cubic spline interpolation coefficients, which are for each of the values of t, and the weighting coefficient w obtained from the weighting table storing means 3 on the basis of the density vectors Pv. The calculations are carried out with Formulas (21), (22), (23), and (24). That is, since the larger the density vector is, the smaller the weighting coefficient w is, the coefficients by which the cubic spline interpolation coefficients $c_{k-1}$, $c_k$, $c_{k+1}$, and $c_{k+2}$ are multiplied in Formulas (21), (22), (23), and (24) become larger while the coefficients by which the B spline interpolation coefficients $b_{k-1}$, $b_k$, $b_{k+1}$, and $b_{k+2}$ are multiplied in Formulas (21), (22), (23), and (24) become smaller as the density vector Pv becomes larger. To the contrast, since the smaller the density vector is, the larger the weighting coefficient w is, the coefficients by which the cubic spline interpolation coefficients $c_{k-1}$, $c_k$, $c_{k+1}$, and $c_{k+2}$ are multiplied in Formulas (21), (22), (23), and (24) become smaller while the coefficients by which the B spline interpolation coefficients $b_{k-1}$, $b_k$, $b_{k+1}$, and $b_{k+2}$ are multiplied in Formulas (21), (22), (23), and (24) become larger as the density vector Pv becomes smaller.

The information representing the calculated new interpolation coefficients $a_{k-1}$, $a_k$, $a_{k+1}$, and $a_{k+2}$ is fed into the interpolating operation means 7.

The interpolating operation means 7 calculates the value of the interpolated image signal component $Y_p$, which corresponds to the interpolation point $X_p$, for each value of t with Formula (18), which is stored therein and serves as the operation formula with the third-order spline interpolating function, in accordance with the interpolation coefficients $a_{k-1}$, $a_k$, $a_{k+1}$, and $a_{k+2}$, which have been received from the interpolation coefficient operation means 6, and the original image signal components $Y_{k-1}$, $Y_k$, $Y_{k+1}$, and $Y_{k+2}$, which have been received from the image signal storing device 22.

The thus obtained interpolation image signal S' containing the interpolated image signal components, which correspond to all interpolation points, is fed into the image reproducing means 23.

The image reproducing means 23 reproduces a visible image from the received interpolation image signal S'. In the reproduced visible image, edge portions where the density vectors Pv are larger have been interpolated by the cubic spline interpolating operation for a relatively high sharpness and flat portions where the density vectors Pv are smaller have been interpolated by the B spline interpolating operation for a relatively low sharpness. Since the sharpness of the radiation image can thus be adjusted according to what part of the body the image is, an interpolation image without enhanced noise in flat portions nor blur in edge portions.

Though, in the embodiment described above, the final interpolation coefficients are obtained by linearly combining the cubic spline interpolation coefficients and the B spline interpolation coefficients, second-order linear interpolation coefficients (bilinear) may be employed as the interpolation coefficients for a relatively low sharpness with the cubic spline interpolation coefficients employed as the interpolation coefficients for a relatively high sharpness. Further, in the following Formulas (8') and (9') obtained by adding a parameter k in the aforesaid Formulas (8) and (9), an interpolation image having a higher sharpness can be obtained by changing the value of the parameter k. In such a case, cubic spline interpolation coefficients based on the Formulas (8') and (9') may be employed as the interpolation coefficients for a relatively high sharpness with cubic spline interpolation coefficients based on the Formulas (8) and (9) employed as the interpolation coefficients for a relatively low sharpness.

$$f_k'(X_k) = k(Y_{k+1} - Y_{k-1})/(X_{k+1} - X_{k-1}) \qquad (8')$$

$$f_k'(X_{k+1}) = k(Y_{k+2} - Y_k)/(X_{k+2} - X_k) \qquad (9')$$

Though, in the embodiment described above, a monotonously decreasing function such as shown in FIG. 4 is employed as the weighting coefficient w, functions such as $$y = ax + 1$$

$$y = ae^x$$

may be employed as the monotonously decreasing function.

In the image reproducing system provided with this embodiment, the interpolating operation apparatus 1 utilizes the primary image signal having been previously stored in the image signal storing device 22. However, the interpolating operation apparatus in accordance with the present invention is not limited to this embodiment. For example, an image signal representing an image, which has been detected by using an image read-out apparatus illustrated in FIG. 5, may be utilized.

Figure 5:
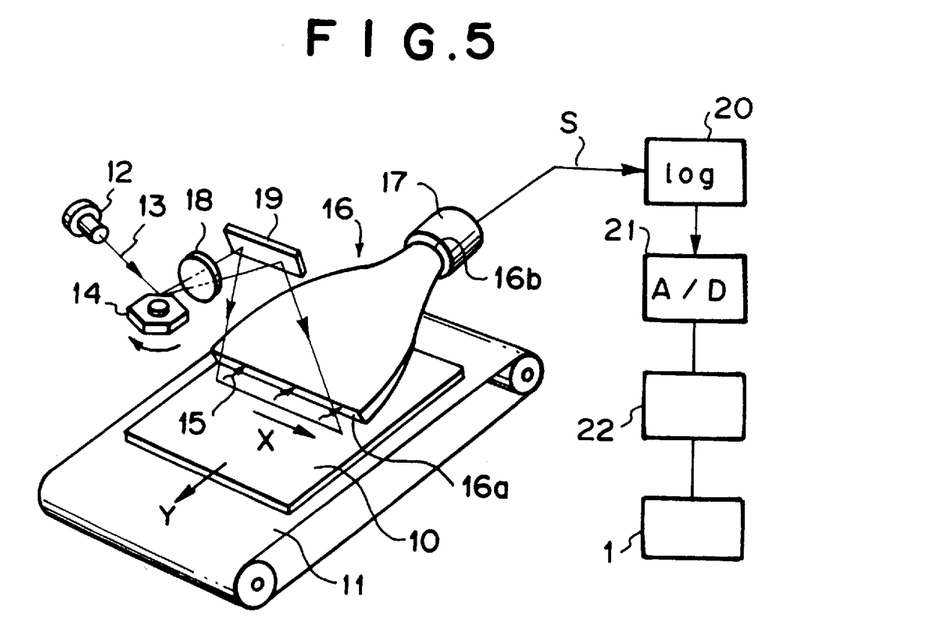
FIG. 5 is a perspective view showing an image read-out apparatus.

Specifically, with the image read-out apparatus illustrated in FIG. 5, an X-ray image of an object, which has been stored on a stimulable phosphor sheet 10, is read from the stimulable phosphor sheet 10.

The stimulable phosphor sheet 10 has been exposed to radiation such as X-rays through an object such as a human body and transmission radiation image information has been stored on the stimulable phosphor sheet 10. The stimulable phosphor sheet 10 is conveyed in a sub-scanning direction, which is indicated by the arrow Y, by a conveyor means 11 such as an endless belt. A laser beam 13, which serves as stimulating rays (read-out rays), is emitted from a laser 12 such as a semiconductor laser. The laser beam 13 is reflected and deflected by a rotating polygon mirror 14 which is quickly rotated. The laser beam 13 then passes through a scanning lens 18, which may be generally constituted of an fθ lens. The direction of the optical path of the laser beam 13 is then changed by a mirror 19, and the laser beam 13 impinges upon the stimulable phosphor sheet 10 and scans it in a main scanning direction indicated by the arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17.

The light guide member 16 is made of a light guiding material, such as an acrylic plate. The light guide member 16 has a linear light input face 16a, which is positioned to extend along the main scanning line on the stimulable phosphor sheet 10, and a ring-shaped light output face 16b, which is positioned in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 17, which amount represents the radiation image, is converted into an electric signal by the photomultiplier 17.

An analog output signal S output from the photomultiplier 17 is logarithmically amplified by a logarithmic amplifier 17, and digitized by an analog-to-digital converter 21 at a predetermined reading scale factor. In this manner, an digital original image signal bearing thereon a two-dimensional image is obtained and is input into the aforesaid interpolating operation apparatus 1.

As described above, the primary image signal, which is utilized in the interpolating operation apparatus 1 in accordance with the present invention may be one, which has been previously stored in the image signal storing device 22, or may be one, which is obtained by reading out an image with the image read-out apparatus illustrated in FIG. 5.

What is claimed is:

1. An interpolating operation method for an image signal, comprising the steps of:

obtaining an original image signal, which represents an original image and is made up of a series of original image signal components Yij each representing the value of a corresponding element of the original picture;

linearly combining interpolation coefficients Cij and Bij, which correspond to each other and are set for each of the original image signal components Yij, in an interpolating function α=ΣCij·Yij for obtaining an interpolation image having a relatively high sharpness and an interpolation function β=ΣBij·Yij for obtaining an interpolation image having a relatively low sharpness, the linear combination being carried out according to the function Aij={(1−w)·Cij}+(w·Bij), w being a weighting coefficient, to obtain a new interpolation coefficient Aij; and carrying out an interpolating operation on the original image signal components Yij by using an interpolating function h=ΣAij·Yij to obtain an interpolation image signal, the interpolation image signal being made up of a series of image signal components each representing the value of a corresponding interpolation picture element, which occur at intervals different from those of the original image signal components Yij;

wherein a density vector, Pv, at each interpolation picture element on the image is calculated, and the weighting coefficient w is corrected to be smaller as the corresponding density vector becomes larger.

2. An interpolating operation apparatus for an image signal, wherein:

an original image signal, which represents an original image and is made up of a series of original image signal components Yij each representing the value of a corresponding element of the original picture is obtained, interpolation coefficients Cij and Bij, which correspond to each other and are set for each of the original image signal components Yij, in an interpolating function $\alpha = \Sigma C_{ij} \cdot Y_{ij}$ for obtaining an interpolation image having a relatively high sharpness and an interpolation function $\beta = \Sigma B_{ij} \cdot Y_{ij}$ for obtaining an interpolation image having a relatively low sharpness, are linearly combined, the linear combination being carried out according to the function $A_{ij} = \{(1-w) \cdot C_{ij}\} + (w \cdot B_{ij})$, thereby obtaining a new interpolation coefficient Aij, and an interpolating operation is carried out on the original image signal components Yij by using an interpolating function $h = \Sigma A_{ij} \cdot Y_{ij}$ to obtain an interpolation image signal, the interpolation image signal being made up of a series of image signal components each representing the value of a corresponding interpolation picture element, which occur at intervals different from those of the original image signal components Yij, the apparatus comprising:

a storing means for storing the interpolation coefficients Cij and Bij;

a density vector calculating means for calculating a density vector, Pv, at each interpolation picture element on the image; and a correcting means for correcting the weighting coefficient w to be smaller as the corresponding calculated density vector becomes larger.

3. The interpolating operation method for an image signal as claimed in claim 1, wherein the weighting coefficient w is corrected according to the relation $w = a \cdot |P_v| + 1$, where a is a predetermined constant.

4. The interpolating operation apparatus for an image signal as claimed in claim 2, wherein the weighting coefficient w is corrected by the means for correcting according to the relation $w = a \cdot |P_v| + 1$, where a is a predetermined constant.

5. The interpolating operation method for an image signal as claimed in claim 1, wherein the weighting coefficient w is corrected according to the relation $w = a \cdot \exp(-|P_v|)$, where a is a predetermined constant.

6. The interpolating operation apparatus for an image signal as claimed in claim 2, wherein the weighting coefficient w is corrected by the means for correcting according to the relation $w = a \cdot \exp(-|P_v|)$, where a is a predetermined constant.

* * * * *